United States Patent
Allais et al.

[11] 3,856,967
[45] Dec. 24, 1974

[54] NOVEL INDOLES IN THE TREATMENT OF PAIN

[75] Inventors: André Allais, Les Lilas; Gérard Nominé, Noisy Le Sec, both of France

[73] Assignee: Roussel Uclaf, Paris, France

[22] Filed: July 17, 1972

[21] Appl. No.: 272,375

Related U.S. Application Data

[60] Division of Ser. No. 72,859, Sept. 16, 1970, abandoned, which is a continuation-in-part of Ser. No. 813,709, April 4, 1969, abandoned, which is a continuation-in-part of Ser. No. 790,151, Jan. 9, 1969, abandoned.

[30] Foreign Application Priority Data

| Jan. 11, 1968 | France | 68.135641 |
| Sept. 17, 1969 | France | 69.31578 |
| Dec. 10, 1968 | France | 68.177430 |
| Apr. 10, 1968 | France | 68.147662 |
| Sept. 10, 1968 | France | 68.165689 |
| Sept. 11, 1968 | France | 68.165812 |
| Dec. 10, 1968 | France | 68.177431 |

[52] U.S. Cl. .................. 424/274, 260/326.13 R
[51] Int. Cl. ............................................ A61k 27/00
[58] Field of Search ............. 260/326.13 R; 424/274

[56] References Cited
UNITED STATES PATENTS

3,505,354  4/1970  Doebel et al. ............... 260/326.13
3,557,142  1/1971  Bell ............................... 260/326.13

FOREIGN PATENTS OR APPLICATIONS

1,492,929  7/1967  France ......................... 260/326.13

Primary Examiner—Stanley J. Friedman
Attorney, Agent, or Firm—Hammond & Littell

[57] ABSTRACT

1-carboxyalkyl-2-methyl-indoles of the formula

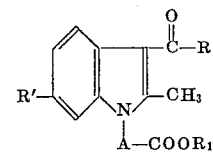

wherein A is a divalent aliphatic hydrocarbon derived from a linear or branched alkyl, R is selected from the group consisting of cyclohexyl and an aromatic radical, R' is selected from the group consisting of halogen, trifluoromethyl, lower alkyl, lower alkoxy and N,N-dilower-alkylamino and $R_1$ is selected from the group consisting of hydrogen and lower alkyl and a cation of a nontoxic, therapeutically acceptable base which possess anti-inflammatory and analgesic activity and their preparation.

6 Claims, No Drawings

NOVEL INDOLES IN THE TREATMENT OF PAIN

PRIOR APPLICATION

This application is a division of copending, commonly assigned U.S. Pat. application Ser. No. 72,859 filed Sept. 16, 1970 which is a continuation-in-part of U.S. application Ser. No. 813,709 filed Apr. 4, 1969 which is a continuation-in-part of U.S. Pat. application Ser. No. 790,151, filed Jan. 9, 1969, now all abandoned.

OBJECTS OF THE INVENTION

It is an object of the invention to provide novel 1-carboxyalkyl-2-methyl-indoles of formula I.

It is another object of the invention to provide a process for the preparation of the indoles of formula I.

It is a further object of the invention to provide novel analgesic compositions.

It is an additional object of the invention to provide a novel method of relieving pain and inflammation in warm-blooded animals.

These and other objects and advantages of the invention will become obvious from the following detailed description.

THE INVENTION

The novel indoles of the invention have the formula

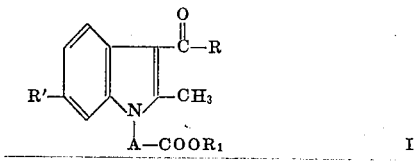

wherein A is a divalent aliphatic hydrocarbon derived from a linear or branched alkyl, R is selected from the group consisting of cyclohexyl and an aromatic radical, R' is selected from the group consisting of halogen, trifluoromethyl, lower alkyl, lower alkoxy and N,N-dilower alkylamino and $R_1$ is selected from the group consisting of hydrogen and lower alkyl and a cation of a nontoxic, therapeutically acceptable base.

Preferred examples of R are cyclohexyl, pyridyl, furyl, phenyl and phenyl substituted with at least one substituent of the group consisting of halogen, trifluoromethyl, alkyl and alkoxy of one to seven carbon atoms, alkylthio of one to seven carbon atoms, and alkyl sulfonyl of one to seven alkyl carbon atoms.

Examples of suitable nontoxic, pharmaceutically acceptable bases for forming the salts of formula I are alkali metal hydroxides or carbonates or bicarbonates, alkaline earth metal carbonates, etc., alkylamines such as dimethylamine, alkanol amines such as triethanol amine, etc., aluminum hydroxide.

Among the preferred compounds of formula I are 1-carboxy-methyl-2-methyl-3-p-chlorobenzoyl-6-methoxy-indole, 1-carboxymethyl-2-methyl-3-p-chlorobenzoyl-6-chloro-indole, 1-carboxymethyl-2-methyl-3-p-methoxybenzoyl-6-methoxy-indole, 1-carboxymethyl-2-methyl-3-p-methylbenzoyl-6-methoxy-indole, 1-carboxymethyl-2-methyl-3-p-trifluoromethylbenzoyl-6-methoxy-indole, 1-carboxy-methyl-2-methyl-3-p-fluorobenzoyl-6-methoxy-indole, 1-carboxy-methyl-2-methyl-3-p-chlorobenzoyl-6-butoxy-indole, d,1 1-(α-carboxyethyl)-2-methyl-3-p-chlorobenzoyl-6-methoxy-indole and d,1 1-(α-carboxyethyl)-2-methyl-3-p-chlorobenzoyl-6-chloro-indole.

The 2-methyl-indoles of formula I posses interesting pharmacological properties, namely an intense analgesic activity which make them useful for the treatment of pain symptoms, traumatisms and viscera spasms. Moreover, they show a clear anti-inflammatory activity which reinforces the analgesic effect. This makes them useful for the treatment of rheumatic maladies, arthritis, arthrosis, gout and tendinitis.

The novel process of the invention for the preparation of 2-methyl-indoles of formula I comprises acylating a 2-methyl-6-R'-indole of the formula

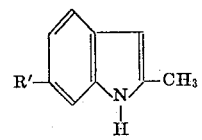

wherein R' has the above definition with an N, N-dilower alkyl amide of the formula

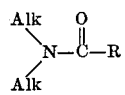

wherein R has the above definition and Alk is lower alkyl in the presence of a reactive halogenating agent used for reactions of the Vilsmeier-Haack type, hydrolyzing the resulting complex formed under basic conditions to form a 2-methyl-3-COR-6-R'-indole of the formula

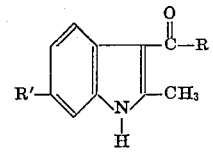

reacting the latter with an alkaline metallation agent to form the corresponding alkaline derivative and condensing the latter with a lower alkyl ester of halogenated acid of the formula Hal-A-COO Alk'

wherein Hal is selected from the group consisting of chlorine, bromine and iodine, Alk' is a lower alkyl and A has the above definition to obtain the corresponding 1-carboalkoxyalkyl-2-methyl-6-R'-indole of formula I wherein $R_1$ is the lower alkyl which, if desired, can be saponified to the indole of formula I wherein $R_1$ is hydrogen and the latter may be salified by known methods with a nontoxic pharmaceutically acceptable base.

The halogenating agent used to effect the acylation of the 2-methyl-indole of formula II may be thionyl chloride, phosphorous oxychloride or phosgene. The basic agent for effecting the hydrolysis of the resulting complex is preferably an alkali metal hydroxide or carbonate such as sodium hydroxide or potassium hydroxide and the hydrolysis is preferably effected in an organic solvent such as a lower alkanol.

The alkaline metallation agent may be an alkali metal hydride, an alkali metal amide, an alkali metal, an alkali metal alcoholate or an organo alkali metal and the reaction therewith is preferably performed in an organic solvent such as dimethylformamide. The lower alkyl ester of formula V is preferably the methyl or ethyl ester. The saponification of the lower alkyl ester of formula I may be effected in the presence of a basic agent such as sodium hydroxide or potassium hydroxide and is advantageously effected in an organic solvent such as lower alkanol.

The 2-methyl-6-R'-indoles of formula II used as starting materials for the process of the invention can be prepared by the condensation of a dialkylketal of pyruvic aldehyde with a properly substituted aniline of the formula:

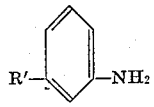

reducing the resulting dialkylketal of 2-(3'-R'-phenylimino)-propionaldehyde with a reducing agent such as an alkali metal borohydride to form the dialkylketal of 2-(3'-R'-phenylamino) propionaldehyde and cyclizing the latter in the presence of an appropriate catalyst such as boron trifluoride to form the 2-methyl-indole of formula II. The said process is particularly useful for compounds of formula II in which R' is alkoxy such as butoxy or methoxy.

The 2-methyl-6-R'-indole of formula II may also be prepared by condensing nitroethane with an orthonitrobenzaldehyde of the formula

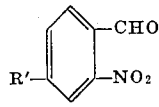

to form the corresponding 1-(2'-nitro-4'-R'-phenyl)-2-methyl-2-nitroethylene and reducing the latter with a reducing agent such as the acetic acid-iron system to form the 2-methyl-indole of formula II. This method is useful for preparing 2-methyl-indoles where R' is halogen such as chlorine.

Other known methods may be used to prepare the 2-methyl-6-R'-indoles of formula II. 2-methyl-indole may be obtained by cyclization of N-acetyl-orthotoluidine [Org. Synth. Vol. 22 (1942 Ed.) p. 94]. 2methyl-6-chloro-indole may be prepared by reducing 1-(2'-nitro-4'-chlorophenyl)-propan-2-one with zinc and acetic acid [Piper at al, Journ. Heterocyclic Chem. Vol. 3 (1966) p. 95]. 2-methyl-6-methoxy-indole may be prepared by Raney nickel reduction of 3-(2-methyl-6-methoxy-indolyl)phenyl thioether [Wieland et al, Ber. Vol. 96 (1963) p. 260].

The N,N-dialkylamides of formula III can be conveniently prepared by reacting a dialkylamine with the appropriate acid chloride. N,N-dimethyl-p-chlorobenzamide is described in Beilstein Vol. 9, page 341, N,N-dimethyl-o-chlorobenzamide in Beilstein Vol. 9, p. 336 and N,N-dimethylbenzamide in Beilstein Vol. 9, p. 201. The diethylamide of isonicotinic acid is described in J. Chem. Soc. Japan Vol. 61 (1940) p. 121, N,N-dimethyl-hexahydrobenzamide in Org. Syn. Vol. 39 (1959 Ed.) p. 19 and N,N-dimethyl-p-methoxy-benzamide in Beilstein Vol. 10, 1st Supp., p. 78.

The novel analgesic and anti-inflammatory compositions of the invention are comprised of an effective amount of at least one 2-methyl-indole of formula I and a major amount of a pharmaceutical carrier. The usual useful individual dose is 50 to 250 mg. The compositions may be in the form of injectable solutions or suspension in ampoules or multiple dose flacons, in the form of tablets, coated tablets, capsules, syrups, pomades, creams and suppositories.

Due to their intense analgesic action and accompanying anti-inflammatory activity, the compositions are useful for the treatment of all muscular, articular or nervous aches, rheumatic symptoms, dental pain, zona, migrains and as a complementary treatment of febrile and infectious states.

The novel method of the invention for relieving pain and inflammation in warm-blooded animals comprises administering to warm-blooded animals a safe and effective amount of at least one 2-methyl-indole of formula I. The said compounds may be administered orally, transcutaneously, rectally or topically on skin or mucosa. The usual useful daily dosage is 0.5 mg to 35 mg/kg depending upon the specific method of administration.

In the following examples there are described several preferred embodiments to illustrate the invention. However, it should be understood that the invention is not intended to be limited to the specific embodiments.

EXAMPLE I

Preparation of 1-carboxymethyl-2-methyl-3-p-chlorobenzoyl-6-methoxy-indole

STEP A: 1-(2'-nitro-4'-methoxyphenyl)-2-methyl-2-nitroethylene 15 gm of 2-nitro-4-methoxybenzaldehyde (Boon, Soc., 1949 Suppl., p. 230) were introduced into a mixture of 75 cc of acetic acid, 9.5 cc of nitroethane and 6.5 gm of ammonium acetate and the resulting mixture was heated to reflux and held there for 2 hours. After cooling the mixture to room temperature, the mixture was added to ice water and the precipitate formed was recovered by vacuum filtration. The precipitate was washed with water and twice crystallized from ethanol and treated with carbon black to obtain 9.6 gm of 1-(2'-nitro-4'-methoxyphenyl)-2-methyl-2-nitroethylene having a melting point of 111° C.

| Analysis: | $C_{10}H_{10}N_2O_5$; molecular weight = 238.20 | | |
|---|---|---|---|
| Calculated: | %C 50.42 | %H 4.23 | %N 11.76 |
| Found: | 50.7 | 4.4 | 11.9 |

STEP B: 2-methyl-6-methoxy-indole 32 gm of 1-(2'-nitro-4'-methoxyphenyl)-2-methyl-2-nitroethylene and 3.2 gm of palladized charcoal containing 18% palladium were introduced into a mixture of 320 cc of ethyl acetate, 48 cc of ethanol and 240 cc of acetic acid and after a purge with nitrogen then with hydrogen, the mixture was agitated under a hydrogen atmosphere. The reaction temperature was allowed to rise to 50° C and was held at that temperature by cooling. 18.2 liters of hydrogen were absorbed in 3 hours after which the reaction mixture was purged with nitrogen and the catalyst was removed by filtration. The reaction mixture was concentrated to dryness under reduced pressure and the residue was dissolved in methylene chloride. The methylene chloride solution was washed with an aqueous solution of sodium bicarbonate, with water, was dried and concentrated to dryness under reduced pressure. The residue was crystallized from petroleum ether (boiling point = 65°–75°C) and the resulting product was dissolved in ether. The ether solution was filtered over alumina and 6.4 gm of 2-methyl-6-methoxy-indole having a melting point of 104° C were obtained therefrom.

| U. V. Spectrum (ethanol) | | |
|---|---|---|
| λ max. at 222–223 mμ | $E^{1\%}_{1cm}$ | = 2085 |
| λ max. at 265 mμ | $E^{1\%}_{1cm}$ | = 298 |
| λ max. at 295 mμ | $E^{1\%}_{1cm}$ | = 352 |

The compound is identical to that described by Späth et al (Ber., Vol. 58, 1925) and Wieland et al (Ber., Vol. 96, 1963, p. 260).

STEP C: 2-methyl-3-p-chlorobenzoyl-6-methoxy-indole 9 gm of 2-methyl-6-methoxy-indole were added to a suspension of 20.6 gm of N, N-dimethyl-p-chlorobenzamide and 6.4 cc of phosphorus oxychloride. The interior reaction temperature obtained was brought to 60° C and rapidly rose to 115° C, the temperature was reduced and held for 2 hours at 85° C. The temperature was then reduced to 50° C and the reaction mixture was added to water and then 400 cc of ethanol were added thereto. The reaction mixture was adjusted to a pH of 10 by the addition of sodium hydroxide solution and was stirred at room temperature overnight. The precipitate was recovered by filtration and washed with water until the wash-waters were neutral. The precipitate was empasted with 20 cc of ethanol at 20° C, vacuum filtered and dried at 60° C to obtain 16.5 gm of 2-methyl-3-p-chlorobenzoyl-6-methoxy indole having a melting point of 208° C.

The product occured in the form of a yellow solid which was soluble in chloroform, slightly soluble in alcohol and benzene and insoluble in water.

| Analysis: | $C_{17}H_{14}Cl\ NO_2$; molecular weight = 299.75 | | | |
|---|---|---|---|---|
| Calculated: | %C 68.11 | %H 4.71 | % Cl 11.83 | % N 4.67 |
| Found: | 68.2 | 4.9 | 11.7 | 4.4 |

| U.V. Spectrum (ethanol) | | |
|---|---|---|
| λ max. at 213 mμ | $E^{1\%}_{1cm}$ | = 1335 |
| λ max. at 249 mμ | $E^{1\%}_{1cm}$ | = 636 |
| λ max. at 289 mμ | $E^{1\%}_{1cm}$ | = 356 |
| λ max. at 330 mμ | $E^{1\%}_{1cm}$ | = 221 |

As far as is known, this compound is not described in the literature.

Step D: Methyl ester of 1-carboxymethyl-2-methyl-3-p-chlorobenzoyl-6-methoxy-indole 20 cc of dimethylformamide were added to 0.32 gm of a 50 % suspension of sodium hydride in oil and then a solution of 2 gm of 2-methyl-3-p-chlorobenzoyl-6-methoxy-indole in 20 cc of dimethylformamide was added thereto. After hydrogen evolution ceased, a solution of 1 gm of methyl monochloro-acetate in 5 cc of dimethylformamide was added and the reaction mixture was stirred overnight at room temperature. The mixture was evaporated to dryness and the residue was taken up in water and vacuum filtered. The crystals were washed with water and dried in vacuo at 60° C to obtain 2.5 gm of product which was purified by recrystallization from hot and cold methanol to give 1.9 gm of the methyl ester of 1-carboxymethyl-2-methyl-3-p-chloro-benzoyl-6-methoxy-indole having a melting point of 148°–149° C.

The product occurred in the form of yellow crystals soluble in chloroform, slightly soluble in alcohol and benzene and insoluble in water and ether.

| Analysis: | $C_{20}H_{18}ClNO_4$; molecular weight = 371.81 | | | |
|---|---|---|---|---|
| Calculated: | %C 64.60 | %H 4.88 | % Cl 9.54 | % N 3.77 |
| Found: | 64.7 | 5.0 | 9.6 | 4.0 |

I. R. Spectrum (chloroform)
Absence of NH
Presence of Ester: Band at 1752 cm$^{-1}$ and 1741 cm$^{-1}$
Conjugated ketone band at 1619 cm$^{-1}$ Presence of an aromatic ring substituted with a hetero atom.

As far as is known, this compound is not described in the literature.

STEP E: 1-carboxymethyl-2-methyl-3-p-chlorobenz-oyl-6-methoxy-indole 2.25 gm of potassium hydroxide were dissolved in 100 cc of methanol and 5 cc of water and then 7.45 gm of the methylester of 1-carboxymethyl-2-methyl-3-p-chlorobenzoyl-6-methoxy-indole were added thereto. The mixture was heated at reflux for 1 hour and then was concentrated to dryness. The residue was taken up in 70 cc of boiling water and the solution was filtered while hot. The filtrate was cooled to 20° C and acidified to a pH of 1 by the addition of 30 cc of 2N hydrochloric acid. The precipitate was recovered by vacuum filtration and was washed with water, then methanol and finally ether and was dried at 70° C. The resulting 6.3 gm of product was purified by recrystallization from ethanol to obtain 3.7 gm of 1-carboxymethyl-2-methyl-3-p-chloro-benzoyl-6-methoxy-indole having a melting point of 242°C.

The product was soluble in dilute aqueous alkalis, slightly soluble in alcohol and insoluble in water.

| Analysis: | $C_{19}H_{16}Cl\ NO_4$; molecular weight = 357.79 | | | |
|---|---|---|---|---|
| Calculated: | %C 63.78 | %H 4.51 | % Cl 9.91 | % N 3.91 |
| Found: | 64.0 | 4.5 | 10.1 | 4.0 |

| U. V. Spectrum (ethanol) | | | |
|---|---|---|---|
| λ max. at 214 mμ | $E^{1\%}_{1cm}$ | = 1,120 | Σ = 40,070 |
| λ max. at 251 mμ | $E^{1\%}_{1cm}$ | = 550 | Σ = 19,678 |
| λ max. at 291 mμ | $E^{1\%}_{1cm}$ | = 291 | |

λ max. at 331 mμ     $E_{1cm}^{1\%}$ = 191

As far as is known, this compound is not described in the literature.

EXAMPLE II

Preparation of 1-carboxymethyl-2-methyl-3-p-methylbenzoyl-6-methoxy-indole

STEP A: 2-methyl-3-p-methylbenzoyl-6-methoxy-indole

First, 9.9 gm of N,N-dimethyl-p-methylbenzamide (Beilstein, Vol. 9, p. 486) and then 4.8 gm of 2-methyl-6-methoxy-indole were added to 3.45 cc of phosphorus oxychloride and the temperature of the reaction mixture was raised to 85° C and held there for 2 hours. After cooling, the reaction mixture was diluted with ethanol and the resulting ethanolic solution was poured in water. The pH of the solution was adjusted to 10 by addition of a sodium hydroxide solution and after stirring the precipitate formed was recovered by vacuum filtration and was washed with ether. The product was crystallized from ethanol and treated with carbon black to obtain 4.5 gm of 2-methyl-3-p-methylbenzoyl-6-methoxy-indole having a melting point of 217° C.

| Anaylsis: | $C_{18}H_{17}NO_2$: molecular weight = 279.33 | | |
|---|---|---|---|
| Calculated: | %C 77.40 | %H 6.13 | %N 5.01 |
| Found: | 77.4 | 6.3 | 4.9 |

U. V. Spectrum (ethanol)

| λ max. at 214 mμ | $E_{1cm}^{1\%}$ | = 1400 |
|---|---|---|
| λ max. at 250 mμ | $E_{1cm}^{1\%}$ | = 614 |
| λ max. at 287–288 mμ | $E_{1cm}^{1\%}$ | = 408 |
| λ max. at 327 mμ | $E_{1cm}^{1\%}$ | = 246 |

As far as is known, this compound is not described in the literature.

STEP B: Methyl ester of 1-carboxymethyl-2-methyl-3-p-methylbenzoyl-6-methoxy-indole 0.83 gm of a 50% suspension of sodium hydride in vaseline oil were added to 40 cc of dimethylformamide and a solution of 5 gm of 2-methyl-3-p-methylbenzoyl-6-methoxy-indole in 50 cc of dimethylformamide was added thereto over 30 minutes during which a volume of 385 cc of hydrogen evolved. A solution of 2.4 cc of methyl monochloroacetate in 50 cc of dimethylformamide was slowly added to the resulting solution and the mixture was stirred for 15 hours at room temperature. The mixture was concentrated to dryness under reduced pressure and the residue was added to water. The precipitate formed was recovered by vacuum filtration and was crystallized from ethanol and treated with carbon black to obtain 4.7 gm of the methyl ester of 1-carboxymethyl-2-methyl-3-p-methylbenzoyl-6-methoxy-indole having a melting point of 158° C. The product was used as is for the next step.

As far as is known, this product is not described in the literature.

STEP C: 1-carboxymethyl-2-methyl-3-p-methylbenzoyl-6-methoxy-indole 1.5 gm of potassium hydroxide were dissolved in a mixture of 100 cc of methanol and 10cc of water and 4.6 gm of the methyl ester of 1-carboxymethyl-2-methyl-3-p-methyl-benzoyl-6-methoxy-indole were added to the resulting solution. The mixture was heated to reflux and held there for one hour. After cooling, the mixture was concentrated to dryness under reduced pressure and the residue was dissolved in a minimum of water. After treatment with carbon black and filtration, the filtrate was adjusted to a pH of 1. The precipitate formed was recovered by vacuum filtration and then was washed with water until neutral and recrystallized from methanol to obtain 3.6 gm of 1-carboxymethyl-2-methyl-3-p-methylbenzoyl-6-methoxy-indole having a melting point of 246° C.

| Analysis: | $C_{20}H_{19}NO_4$; molecular weight = 337.38 | | |
|---|---|---|---|
| Calculated: | %C 71.20 | %H 5.68 | %N 4.15 |
| Found: | 71.1 | 5.8 | 4.3 |

U. V. Spectrum (ethanol):

| λ max. at 215–216 mμ | $E_{1cm}^{1\%}$ | = 1,160 |
|---|---|---|
| λ max. at 254–255 mμ | $E_{1cm}^{1\%}$ | = 532 |
| λ max. at 291–292 mμ | $E_{1cm}^{1\%}$ | = 337 |
| λ max. at 327–328 mμ | $E_{1cm}^{1\%}$ | = 212 |

As far as is known, this compound is not described in the literature.

EXAMPLE III

Preparation of d,1 1-(α-carboxyethyl)-2-methyl-3-p-chloro-benzoyl-6-methoxy-indole STEP A: Ethyl ester of d, 1 1-(α-carboxyethyl)-2-methyl-3-p-chlorobenzoyl-6-methoxy-indole 1.12 gm of a 50 % suspension of sodium hydride in vaseline oil was added to 10 cc of dimethylformamide and 7 gm of 2-methyl-3-p-chlorobenzoyl-6-methoxy-indole (made as in Example I) in solution in 90 cc of dimethylformamide were added thereto during which 525 cc of hydrogen evolved. A solution of ethyl d, 1-α-bromopriopionate (Beilstein, Vol. 2, p. 255) in 20 cc of dimethylformamide was introduced into the reaction mixture and after sitrring for 15 hours at room temperature, the mixture was concentrated to dryness under reduced pressure. The residue was taken up in water and the aqueous phase was extracted with benzene. The benzene solution was concentrated to dryness to obtain 9.7 gm of the ethyl ester of d, 1 1-(α-carboxyethyl)-2-methyl-3-p-chlorobenzoyl-6-methoxy-indole. The raw product was used as such for the next step.

As far as is known, this compound is not described in the literature.

STEP B: d, 1 1-(α-carboxyethyl)-2-methyl-3-p-chlorobenzoyl-6-methoxy-indole 2.4 gm of potassium hydroxide were dissolved in a mixture of 100 cc of methanol and 10 cc of water and 8.7 gm of the ethyl ester of d, 1 1-(α-carboxyethyl)-2-methyl-3-p-chlorobenzoyl-6-methoxy-indole were added thereto. The reheated to reflux to reflux and held fhere for 1 hour. The mixture action mixture was concentrated to dryness under reduced pressure and the residue was taken up in hot water. The solution was filtered to remove slight persistent insolubles and the filtrate was acidified to a pH of 1. The precipitate formed was recovered by vacuum filtration and was washed, dried and then recrystallized from ether, then acetonitrile and treated with carbon black to obtain 4.1 gm of d, 1 1-(α-carboxyethyl)-2-methyl-3-p-chlorobenzoyl-6-methoxy-indole having a melting point of 178° C.

| Analysis: | $C_{20}H_{18}ClNO_4$; molecular weight = 371.81 | | | |
|---|---|---|---|---|
| Calculated: | %C 64.60 | %H 4.88 | %Cl 9.54 | %N 3.77 |
| Found: | 64.5 | 4.8 | 9.7 | 3.7 |

As far as is known, this compound is not described in the literature.

EXAMPLE IV

Preparation of 1-carboxymethyl-2-methyl-3-p-fluorobenzoyl-6-methoxy-indole

STEP A: N,N-dimethyl-p-fluorobenzamide 12.9 gm of p-fluorobenzoyl chloride (Beilstein, Vol. 9, I, p. 137) dissolved in 40 cc of benzene were slowly added while maintaining a temperature of 35° C to 180 cc of a solution of dimethylamine in benzene titrating 6.25 gm % per cc. The resulting mixture was agitated at room temperature for 15 hours and the resulting suspension was washed with water. The benzene phase was decanted off, dried and concentrated to dryness under reduced pressure to obtain 11.1 gm of N,N-dimethyl-p-fluorobenzamide having a melting point of 64° C. A portion of the product when recrystallized from petroleum ether (b.p. of 65°–75° C) had a melting point of 64° C.

| Analysis: | $C_9H_{10}FNO$ ; molecular weight = 167.18 | | | |
|---|---|---|---|---|
| Calculated: | %C 64.65 | %H 6.03 | %F 11.36 | %N 8.38 |
| Found: | 64.7 | 5.7 | 11.2 | 8.2 |

As far as is known, this compound is not described in the literature.

STEP B: 2-methyl-3-p-fluorobenzoyl-6-methoxy-indole 1.61 gm of 2-methyl-6-methoxy-indole were added to a suspension of 3.3 gm of N,N-dimethyl-p-fluorobenzamide in 1.15 cc of phosphorus oxychloride and the mixture was heated at 80°–85° C for 2 ½ hours. After cooling to 50° C, 10 cc of ethanol were added and the alcoholic solution was poured into water and the pH was adjusted to 10 by the addition of a sodium hydroxide solution. After stirring for 2 ½ hours at room temperature, the mixture was vacuum filtered and the precipitate was washed with water until the wash waters were neutral and empasted with ether. The precipitate was recrystallized from ethanol, vacuum filtered and dried at 70° C to obtain 2 gm (71% yield) of 2-methyl-3-p-fluorobenzoyl-6-methoxy-indole having a melting point of 228° C.

The product occurred in the form of rose crystals soluble in alcohol, slightly soluble in chloroform and insoluble in water.

| Analysis: | $C_{17}H_{14}FNO_2$; molecular weight = 283.29 | | | |
|---|---|---|---|---|
| Calculated: | %C 72.07 | %H 4.98 | %F 6.71 | %N 4.94 |
| Found: | 71.8 | 5.1 | 6.7 | 5.0 |

U. V. Spectrum (ethanol)

| λ max. at 246 mμ | $E^{1\%}_{1cm}$ | = 573 |
|---|---|---|
| λ max. at 290 mμ | $E^{1\%}_{1cm}$ | = 372 |
| λ max. at 331–332 mμ | $E^{1\%}_{1cm}$ | = 234 |

As far as is known, this compound is not described in the literature.

STEP C: 1-carbomethoxymethyl-2-methyl-3-p-fluorobenzoyl-6-methoxy-indole

A solution of 5 gm of 2-methyl-3-p-fluorobenzoyl-6-methoxy-indole in 50 cc of dimethylformamide was added to a mixture of 45 cc of dimethylformamide and 0.85 gm of a 50% suspension of sodium hydride in mineral oil and after the evolution of 360 cc of hydrogen, a solution of 2.3 cc of methyl monochloroacetate in 20 cc of dimethylformamide was added thereto. After stirring the reaction mixture at room temperature overnight, it was evaporated to dryness in vacuo and the residue was taken up in water. The solution was vacuum filtered and the precipitate was washed with water. The precipitate was redissolved in hot ethanol, treated with carbon black, filtered and allowed to cool. The precipitate was vacuum filtered and dried to vacuo to obtain 5.30 gm (85% yield) of 1-carbomethoxymethyl-2-methyl-3-p-fluorobenzoyl-6-methoxy-indole having a melting point of 136° C.

The product occurred in the form of pale yellow crystals soluble in alcohol and chloroform, slightly soluble in ether and insoluble in water.

The product was used as is for the next step.

As far as is known, this compound is not described in the literature.

STEP D: 1-carboxymethyl-2-methyl-3-p-fluorobenzoyl-6-methoxy-indole 0.32 gm of potassium hydroxide pellets were dissolved in 30 cc of methanol and 3 cc of water and 1 gm of 1-carbomethoxymethyl-2-methyl-3-p-fluorobenzoyl-6-methoxy-indole was added thereto. The mixture was stirred for 1 hour at 22° C and then was evaporated to dryness in vacuo. The residue was dissolved in 50 cc of water heated to 50° C, treated with carbon black and was then filtered. The filtrate was brought to room temperature and the pH of the filtrate was adjusted to 1 by the addition of hydrochloric acid. The resulting precipitate was vacuum filtered and washed with water until the wash waters were neutral. After recrystallization from hot and cold ethanol and treatment with carbon black, the precipitate was vacuum filtered and dried in vacuo at 70° C to obtain 0.65 gm (68% yield) of 1-carboxymethyl-2-methyl-3-p-fluorobenzoyl-6-methoxy-indole having a melting point of 200°–202° C.

The product occurred in the form of yellow crystals soluble in ethanol and insoluble in water, ether and chloroform.

Analysis: C₁₉H₁₆FNO₄; molecular weight = 341.33
Calculated: %C 66.86  %H 4.73  %F 5.57  %N 4.10
Found:     66.9       4.4      5.8      3.8

U. V. Spectrum (ethanol):

λ max. at 248 mμ   $E_{1cm}^{1\%}$ = 484

λ max. at 293 mμ   $E_{1cm}^{1\%}$ = 304

λ max. at 330 mμ   $E_{1cm}^{1\%}$ = 196

As far as is known, this compound is not described in the literature.

EXAMPLE V

Preparation of 1-carboxymethyl-2-methyl-3-p-trifluoromethylbenzoyl-6-methoxy-indole
STEP A: N, N-dimethyl-p-trifluoromethylbenzamide A mixture of a solution of 25.7 gm of p-trifluoromethylbenzoyl chloride [Kogyo Kagaku Zasshi, Vol. 67 (5), 1964, p. 807–809] in 50 cc of benzene and 125 cc of a solution of dimethylamine in benzene titrating 13% was maintained at an interior temperature below 35° C and was stirred for 4 hours at room temperature. The benzene phase was washed with water, dried over sodium sulfate and evaporated to dryness in vacuo to obtain 22.6 gm (84.5% yield) of N,N-dimethyl-p-trifluoromethylbenzamide having a melting point of 96° C. Recrystallization of the product from petroleum ether (b.p. of 65°–75° C) did not change the melting point.

The product occurred in the form of colorless crystals soluble in alcohol, benzene, chloroform and ether and insoluble in water.

Analysis: C₁₀H₁₀F₃NO; molecular weight = 217.19
Calculated: %C 55.30  %H 4.64  %F 26.24  %N 6.45
Found:     55.4       4.6      26.2      6.2

As far as is known, this compound is not described in the literature.
STEP B: 2-methyl-3-p-trifluoromethylbenzoyl-6-methoxy-indole 1.61 gm of 2-methyl-6-methoxy-indole was added to a suspension of 4.35 gm of N,N-dimethyl-p-trifluoromethylbenzamide in 1.15 cc of phosphorus oxychloride and the reaction mixture was heated to an interior temperature of 80°–85° C for 2 hours. After cooling to 50° C, 15 cc of ethanol were added and the mixture was poured into water. The pH was adjusted to 10 by the addition of a sodium hydroxide solution and the mixture was stirred for 2 hours at room temperature. The precipitate was recovered by vacuum filtration and was washed with water until the wash waters were neutral, empasted with ethanol and dried in vacuo at 70° C to obtain 2.9 gm of a product melting at 217° C. Upon recrystallization from ethanol, vacuum filtration and drying in vacuo at 70° C to obtain 1.5 gm of 2-methyl-3-p-trifluoromethylbenzoyl-6-methoxy-indole having a melting point of 222° C. After standing at room temperature for 24 hours, the alcoholic liquors of recrystallization gave a second yield of 0.60 gm of the product melting at 222° C, that is a total yield of 2.10 gm (63.5%).

The product occurred in the form of beige crystals soluble in alcohol, slightly soluble in chloroform and insoluble in water.

Analysis: C₁₈H₁₄F₃NO₂; molecular weight = 333.30
Calculated: %C 64.86  %H 4.23  %F 17.10  %N 4.20
Found:     65.2       4.6      16.8      4.4

U. V. Spectrum (ethanol)

λ max. at 210–211 mμ   $E_{1cm}^{1\%}$ = 1040 inflexion towards 245 μ   $E_{1cm}^{1\%}$ = 421

λ max. at 288–289 mμ   $E_{1cm}^{1\%}$ = 306

λ max. at 330 mμ   $E_{1cm}^{1\%}$ = 187

As far as is known, this compound is not described in the literature.
STEP C: 1-carbomethoxymethyl-2-methyl-3-p-trifluoromethylbenzoyl-6-methoxy-indole A solution of 5 gm of 2-methyl-3-p-trifluoromethylbenzoyl-6-methoxy-indole in 50 cc of dimethylformamide was added to a mixture of 0.72 gm of a 50% suspension of sodium hydride in mineral oil and 30 cc of dimethylformamide during which 300 cc of hydrogen evolved. Then, a solution of 2 cc of methyl monochloroacetate and 35 cc of dimethylformamide were added thereto and the mixture was stirred overnight at room temperature. The reaction mixture was evaporated to dryness in vacuo and the residue was taken up in water. The resulting precipitate was vacuum filtered and washed with water. The precipitate was recrystallized from hot methanol, treated with carbon black, vacuum filtered and dried in vacuo at 70° C to obtain 5.20 gm (86% yield) of 1-carbomethoxymethyl-2-methyl-3-p-trifluoromethylbenzoyl-6-methoxy-indole which was used as is for the next step.

The product occurred in the form of yellow crystals having a melting point of 149° C and being soluble in methanol and chloroform, slightly soluble in benzene and ether and insoluble in water.

As far as is known, this compound is not described in the literature.
STEP D: 1-carboxymethyl-2-methyl-3-p-trifluoromethylbenzoyl-6-methoxy-indole 6.1 gm of 1-carbomethoxymethyl-2-methyl-3-p-trifluoromethylbenzoyl-6-methoxy-indole were added to a solution of 1.7 gm of potassium hydroxide pellets in 100 cc of methanol and 10 cc of water and the mixture was held at reflux for one hour and then evaporated to dryness in vacuo. The residue was dissolved in 500 cc of hot water, treated with carbon black, filtered and the filtrate was cooled to 20° C. The pH was adjusted to 1 by the addition of hydrochloric acid and the precipitate formed was recovered by vacuum filtration and was washed with water until the wash waters were neutral. The precipitate was recyrstallized from 70 cc of hot butanol, treated with carbon black, vacuum filtered and the precipitate was dried in vacuo at 70° C to obtain 3.4 gm (57.5% yield) of 1-carboxymethyl-2-methyl-3-p- trifluoromethylbenzoyl-6-methoxy-indole having a melting point of 240°–242° C.

The product occurred in the form of yellow crystals soluble in hot alcohol and dilute aqueous alkalis and insoluble in water, ether, benzene and chloroform.

| Analysis: | $C_{20}H_{16}F_3NO_4$; molecular weight = 391.34 | | | |
|---|---|---|---|---|
| Calculated: | %C 61.38 | %H 4.12 | %F 14.57 | %N 3.58 |
| Found: | 61.6 | 3.8 | 14.4 | 3.4 |

| U. V. Spectrum (ethanol) | | |
|---|---|---|
| λ max. at 214 mµ | $E_{1cm}^{1\%}$ | = 894 |
| inflexion towards 247 mµ | $E_{1cm}^{1\%}$ | = 364 |
| λ max. at 292 mµ | $E_{1cm}^{1\%}$ | = 258 |
| λ max. at 332 mµ | $E_{1cm}^{1\%}$ | = 163 |

As far as is known, this compound is not described in the literature.

EXAMPLE VI

Preparation of 1-carboxymethyl-2-methyl-3-p-methoxybenzoyl-6-methoxy-indole

STEP A: 2-methyl-3-p-methoxybenzoyl-6-methoxy-indole 1.61 gm of 2-methyl-6-methoxy-indole were added to a solution of 3.6 gm of N, N-dimethyl-p-methoxybenzamide (produced by the process of Staudinger, Kon, Ann. Vol. 384, p. 117) in 1.15 cc of phosphorus oxychloride and the resulting mixture was heated at an internal temperature of 80°–85° C for 2 ½ hours. After cooling to 50° C, 25 cc of ethanol were added thereto and the solution was poured into water. The pH was adjusted to 10 by the addition of a sodium hydroxide solution and the solution was agitated for 2 hours at room temperature. The precipitate formed was recovered by vacuum filtration and was washed with water until the wash waters were neutral. The precipitate was recrystallized from ethanol and vacuum filtered and dried in vacuo at 70° C to obtain 2.3 gm (78% yield) of 2-methyl-3-p-methoxybenzoyl-6-methoxy-indole having a melting point of 191° C.

The product occurred in the form of slightly rose crystals soluble in alcohol, slightly soluble in chloroform and insoluble in water, ether and dilute aqueous acids and alkalis.

| Analysis: | $C_{18}H_{17}NO_3$; molecular weight = 295.33 | | |
|---|---|---|---|
| Calculated: | %C 73.20 | %H 5.80 | %N 4.74 |
| Found: | 73.4 | 6.0 | 4.5 |

| U. V. Spectrum (ethanol) | | |
|---|---|---|
| λ max. at 217 mµ | $E_{1cm}^{1\%}$ | = 1335 |
| inflexion towards 259 mµ | $E_{1cm}^{1\%}$ | = 439 |
| λ max. at 283 mµ | $E_{1cm}^{1\%}$ | = 579 |
| λ max. at 323 mµ | $E_{1cm}^{1\%}$ | = 269 |

As far as is known, this compound is not described in the literature.

STEP B: 1-carbomethoxymethyl-2-methyl-3-p-methoxybenzoyl-6-methoxy-indole

A solution of 4.8 gm of 2-methyl-3-p-methoxybenzoyl-6-methoxy-indole in 50 cc of dimethylformamide was added to a mixture of 0.78 gm of a 50% suspension of sodium hydride in mineral oil and 35 cc of dimethylformamide and after the evolution of hydrogen ceased, a solution of 2.2 cc of methyl monochloroacetate in 50 cc of dimethylformamide was added thereto. The mixture was stirred overnight at room temperature and then was evaporated to dryness in vacuo. The residue was taken up in water and vacuum filtered. The precipitate was washed with water and recrystallized from hot methanol, vacuum filtered and dried at 70° C in vacuo to obtain 4.5 gm (75.5% yield) of 1-carbomethoxymethyl-2-methyl-3-p-methoxybenzoyl-6-methoxy-indole having a melting point of 100° C.

The product occurred in the form of slightly rose crystals soluble in hot methanol, soluble in chloroform, slightly soluble in ether and insoluble in water and dilute acids.

The product was used as is for the next step.

As far as is known, this compound is not described in the literature.

STEP C: 1-carboxymethyl-2-methyl-3-p-methoxybenzoyl-6-methoxy-indole 4.4 gm of 1-carbomethoxymethyl-2-methyl-3-p-methoxybenzoyl-6-methoxy-indole were added to a solution of 1.35 gm of potassium hydroxide pellets in 100 cc of methanol and 10 cc of water and the mixture was heated at reflux for 1 hour and evaporated to dryness in vacuo. The residue was dissolved in a small amouont of water at 20° C and the solution was treated with carbon black and was filtered. The pH of the filtrate was adjusted to 1 by the addition of hydrochloric acid and the precipitate recovered by vacuum filtration was washed with water until the wash waters were neutral. The precipitate was recrystallized from hot methanol and vacuum filtered and dried at 70° C in vacuo to obtain 3.30 gm (78% yield) of 1-carboxymethyl-2-methyl-3-p-methoxybenzoyl-6-methoxy-indole having a melting point of 248° C.

The product occurred in the form of pale yellow crystals soluble in hot dilute aqueous alkalis and insoluble in water, chloroform and ether.

| Analysis: | $C_{20}H_{19}NO_5$; molecular weight - 353.36 | | |
|---|---|---|---|
| Calculated: | %C 67.98 | %H 5.42 | %N 3.96 |
| Found: | 68.1 | 5.5 | 4.2 |

I. R. Spectrum (Nujol)P:
Presence of acid C = O at 1723 cm$^{-1}$

| U. V. Spectrum (ethanol): | | |
|---|---|---|
| λ max. at 219 mµ | $E_{1cm}^{1\%}$ | = 1115 |

-Continued

| | | |
|---|---|---|
| inflexion towards 263-264 mµ | $E_{1cm}^{1\%}$ | = 403 |
| λ max. at 285-286 mµ | $E_{1cm}^{1\%}$ | = 490 |
| inflexion towards 322 mµ | $E_{1cm}^{1\%}$ | = 239 |

As far as is known, this compound is not described in the literature.

EXAMPLE VII

Preparation of 1-carboxymethyl-2-methyl-3-p-methylthiobenzoyl-6-methoxy-indole

STEP A: N,N-dimethyl-p-methylthiobenzamide

A solution of 14.6 gm of p-methylthiobenzoyl chloride (Buu-Hoi et al, Bull. Soc. Chim., France, 1946, p. 139) in 35 cc of benzene was added to 162 cc of a benzene solution titrating 6.5 g per hundred cc of dimethylamine and the reaction mixture was stirred at room temperature for 6 hours. The benzene phase was washed with water, dried and concentrated to dryness under reduced pressure. The residue was rectified to obtain 9 gm of N,N-dimethyl-p-methylthiobenzamide having a boiling point of 145°–146° C at 0.85 mm Hg.

| Analysis: | $C_{10}H_{13}NOS$ ; molecular weight = 195.28 | | |
|---|---|---|---|
| Calculated: | %C 61.50 | %H 6.71 | %N 7.17 |
| Found: | 61.5 | 6.9 | 6.9 |

As far as is known, this compound is not described in the literature.

Oxidation of the said product with hydrogen peroxide oxygen in an acetic acid medium gave N,N-dimethyl-p-methylsulfonyl-benzamide melting at 161° C.

| Analysis: | $C_{10}H_{13}NSO_3$; molecular weight = 227.28 | | | |
|---|---|---|---|---|
| Calculated: | %C 52.84 | %H 5.76 | %N 6.16 | %S 14.11 |
| Found: | 52.8 | 5.4 | 6.4 | 14.0 |

As far as is shown, this compound is not described in the literature.

STEP B: 2-methyl-3-p-methylthiobenzoyl-6-methoxy-indole 7.8 gm of N,N-dimethyl-p-methylthiobenzamide were added to 2.30 cc of phosphorus oxchloride and 3.22 gm of 2-methyl-6-methoxy-indole [Spáth et al, Ber., Vol. 58 (1925), p. 518] were added to the solution obtained. The reaction mixture reached a temperature of 85° C and was maintained at this temperature for 2 hours and after the addition of 20 cc of ethanol thereto, the reaction mixture was poured into water. The pH of the mixture was adjusted to 10 by the addition of a sodium hydroxide solution and the mixture was stirred at room temperature for 4 hours. The precipitate recovered by vacuum filtration was washed, crystallized twice from ethanol to obtain 3.6 gm of 2-methyl-3-p-methylthiobenzoyl-6-methoxy-indole melting at 195° C.

| Analysis: | $C_{18}H_{17}NSO_2$; molecular weight = 311.40 | | | |
|---|---|---|---|---|
| Calculated: | %C 69.42 | %H 5.50 | %N 4.50 | %S 10.28 |
| Found: | 69.5 | 5.6 | 4.4 | 10.4 |

U. V. Spectrum (ethanol)

| | | |
|---|---|---|
| λ max. at 216 mµ | $E_{1cm}^{1\%}$ | = 1175 |
| λ max. at 294 mµ | $E_{1cm}^{1\%}$ | = 638 |
| inflexion at 325 mµ | $E_{1cm}^{1\%}$ | = 415 |

As far as is known, this compound is not described in the literature.

STEP C: 1-carbomethoxymethyl-2-methyl-3-p-methylthiobenzoyl-6-methoxy-indole 0.80 gm of a 50% suspension of sodium hydride in vaseline oil was added to 20 cc of dimethylformamide and a solution of 5 gm of 2-methyl-3-p-methylthiobenzoyl-6-methoxy-indole in 50 cc of dimethylformamide was added thereto with the evolution of 370 cc of hydrogen. A solution of 1.8 cc of methyl monochloroacetate in 20 cc of dimethylformamide was added thereto and the reaction mixture was stirred for 15 hours at room temperature and then concentrated to dryness under reduced pressure. The residue was added to water and the precipitate formed was recovered by vacuum filtration and was washed. Crystallization from methanol gave 5.1 gm of 1-carbomethoxymethyl-2-methyl-3-p-methylthiobenzoyl-6-methoxy-indole melting at 128° C. The product was used as is for the next step.

As far as is known, the compound is not described in the literature.

STEP D: 1-carboxymethyl-2-methyl-3-p-methylthiobenzoyl-6-methoxy-indole 5 gm of 1-carbomethoxymethyl-2-methyl-3-p-methylthiobenzoyl-6-methoxy-indole were added to a solution of 1.7 gm of potassium hydroxide in 100 cc of methanol and 10 cc of water. The reaction mixture was heated to reflux and held there for 1 hour. The mixture was cooled and concentrated to dryness under reduced pressure. The residue was dissolved in a minimum of hot water and the solution was filtered and the pH was adjusted to 1 by the addition of hydrochloric acid. The precipitate formed was recovered by vacuum filtration, was washed and dried and crystallized from a mixture of dimethylformamide and ethanol to obtain 4 gm of 1-carboxymethyl-2-methyl-3-p-methylthiobenzoyl-6-methoxy-indole melting at 269° C.

| Analysis: | $C_{20}H_{19}NSO_4$; molecular weight = 369.43 | | | |
|---|---|---|---|---|
| Calculated: | %C 65.02 | %H 5.18 | %N 3.79 | %S 8.68 |
| Found: | 65.0 | 5.1 | 3.8 | 8.7 |

U. V. Spectrum(dimethylsulfoxide)

| | | |
|---|---|---|
| λ max. at 297 mµ | $E_{1cm}^{1\%}$ | = 557 |

-Continued

U. V. Spectrum(dimethylsulfoxide)
inflection at 328 mµ   $E_{1cm}^{1\%}$ = 320

As far as is known, the product is not described in the literature.

EXAMPLE VIII

Preparation of 1-carboxymethyl-2-methyl-3-p-chlorobenzoyl-6-chloro-indole

STEP A: 1-(2'-nitro-4'-chlorophenyl)-2-methyl-2-nitroethylene 27 gm of 2-nitro-4-chloro-benzaldehyde (Suvorov et al, ZH. OBSHCH Khim. Vol. 32, 1962, p. 2,358) and 15.5 cc of nitroethane were added to a mixture of 100 cc of ethanol, 3 cc of of butylamine and 0.5 cc of acetic acid and the reaction mixture was heated to reflux and held there for 15 hours. After cooling, the precipitate formed was recovered by vacuum filtration, was washed and dried to obtain 15.7 gm of 1-(2'nitro-4'-chlorophenyl)-2-methyl-2-nitroethylene melting at 136°–137° C. The product which was used as is for the next step had a melting point of 137° C when crystallized from ethanol.

Analysis: $C_9H_7ClN_2O_4$; molecular weight = 242.63
Calculated: %C 44.55  %H 2.91  %Cl 14.61  %N 11.55
Found:      44.7      3.1      14.6       11.5

As far as is known, this compound is not described in the literature.

STEP B: 2-methyl-6-chloro-indole 4 gm of 1-(2'-nitro-4'-chlorophenyl)-2-methyl-2-nitroethylene were introduced into a mixture of 100 cc of acetic acid and 20 cc of water and after heating the reaction mixture to 95° C, 20 gm of powered iron were added slowly in small fractions. The iron was allowed to settle to the bottom of the flask and the supernatant liquor was poured into water. The reaction mixture was neturalized with sodium bicarbonate addition and the aqeous phase was extracted with ethyl acetate. The organic phases were washed, dried and concentrated to dryness. The residue was chromatographed on silica gel with elution with a benzene: ethylacetate (9:1) mixture to obtain 1.8 gm of raw product melting at 125°–126° C. A portion of the product had a melting point of 126° C after crystallization from cyclohexane.

Analysis: $C_9H_8ClN$ ; molecular weight = 165.62
Calculated: %C 65.26  %H 4.87  %Cl 21.41  %N 8.46
Found:      65.4      4.9      21.2       8.1

U. V. Spectrum (ethanol)
λ max. at 226 mµ       $E_{1cm}^{1\%}$ = 2,195
λ max. at 277 mµ       $E_{1cm}^{1\%}$ = 436
inflexion towards 287 mµ  $E_{1cm}^{1\%}$ = 387

The compound was identical to that prepared by Piper et al, Journ. Heterocyclic Chem., Vol. 3 (1966), p. 95.

STEP C: 2 methyl-3-p-chlorobenzoyl-6-chloro-indole 14.68 gm of N,N-dimethyl-p-chlorobenzamide (Beilstein, vol. 9, p. 341) were added to 4.6 cc of phosphorus oxychloride and 6.6 gm of 2-methyl-6-chloro-indole were added thereto. The reaction mixture was slowly heated and when the temperature reached 60° C, a sudden reaction ensued and the temperature rose to 120° C. The mixture was stirred for the next 2 hours at 25° C. Upon cooling, the mixture was poured into water and ethanol was added to obtain complete solution. The pH was adjusted to 10 by the addition of sodium hydroxide solution and the mixture was stirred for 2 hours at room temperature. The precipitate formed was recovered by vacuum filtration, was washed and crystallized from ethanol to obtain 9 gm of 2-methyl-3-p-chlorobenzoyl-6-chloro-indole melting at 225° C.

U. V. Spectrum (ethanol)
λ max. at 226 mµ       $E_{1cm}^{1\%}$ = 2,195
λ max. at 277 mµ       $E_{1cm}^{1\%}$ = 436
inflexion towards 287 mµ  $E_{1cm}^{1\%}$ = 387

U. V. Spectrum (ethanol):
λ max. at 215 mµ       $E_{1cm}^{1\%}$ = 1340
λ max. at 252 mµ       $E_{1cm}^{1\%}$ = 658
λ max. at 282–283 mµ   $E_{1cm}^{1\%}$ = 361
λ max. at 320–321 mµ   $E_{1cm}^{1\%}$ = 284

As far as is known, this compound is not described in the literature.

STEP D: 1-carbomethoxymethyl-2-methyl-3-p-chlorobenzoyl-6-chloro-indole 1.31 gm of 50% suspension of sodium hydride in vaseline oil were added to 10 cc of dimethylformamide and a solution of 8.3 gm of 2-methyl-3-p-chlorobenzoyl-6-chloro-indole in 50 cc of benzene was added thereto with an evolution of 620 cc of hydrogen. A solution of 2.9 cc of methyl monochloroacetate in 20 cc of dimethylformamide was added to the resulting solution and after stirring for 15 hours at room temperature, it was concentrated to dryness under reduced pressure. The residue was taken up with water and the precipitate formed was recovered by vacuum filtration, was washed and dried and crystallized from benzene to obtain 8.15 gm of 1-carbomethoxymethyl-2-methyl-3-p-chlorobenzoyl-6-chloro-indole melting at 182° C. The product was used as is for the next step.

As far as is known, this compound is not described in the literature.

STEP E: 1-carboxymethyl-2-methyl-3-p-chlorobenzoyl-6-chloro-indole 1.3 gm of potassium hydroxide and then 6 gm of 1-carbomethoxymethyl-2-methyl-3-p-chlorobenzoyl-6-chloro-indole were added to a mixture of 100 cc of methanol and 10 cc of water. The reaction mixture was heated to reflux and maintained there for one hour. The mixture was cooled and concentrated to dryness under reduced pressure. The residue was dissolved in hot water and treated with carbon black and filtered. The pH of the solution was adjusted to 1 by the addition of hydrochloric acid and the resulting precipitate was recovered by vacuum filtration to obtain 4.8 gm of raw product melting at 274° C. The raw product was crystallized from ethanol to obtain 3.6 gm of 1-carboxymethyl-2-methyl-3-p-chlorobenzoyl-6-chloro-indole melting at 274° C.

| Analysis: | $C_{18}H_{13}Cl_2NO_3$; molecular weight = 362.20 | | | |
|---|---|---|---|---|
| Calculated: | %C 59.69 | %H 3.62 | %Cl 19.58 | %N 3.87 |
| Found: | 59.5 | 3.8 | 19.3 | 3.8 |

U. V. Spectrum (ethanol)

| λ max. at 218 mμ | $E_{1cm}^{1\%}$ | = 1 040 |
|---|---|---|
| λ max. at 254–255 mμ | $E_{1cm}^{1\%}$ | = 542 |
| λ max. at 283–284 mμ | $E_{1cm}^{1\%}$ | = 291 |
| λ max. at 322 mμ | $E_{1cm}^{1\%}$ | = 244 |

As far as is known, this compound is not described in the literature.

EXAMPLE IX

Preparation of 1-carboxymethyl-2-methyl-3-p-chlorobenzoyl-6-butoxy-indole

STEP A: Dimethyl ketal of 2-(m-butoxyphenylimino) propionaldehyde.

A solution of 37 gm of m-butoxyaniline [Sekera et al, Ceskoslov Farm., Vo. 5 (1956) p. 388] in 150 cc of benzene and 26.4 gm of dimethylketal of pyruvaldehyde (Beilstein, Vol. 1, p. 395) were added to an apparatus equipped with a decanter for water entrained by azeotropic distillation for entrained water. The reaction mixture was heated to reflux and maintained there for 2 hours. 13.2 gm of dimethylketal of pyruvaldehyde were added and reflux was continued for another 4 hours while recovering 4 cc of water. The reaction mixture was concentrated to dryness under reduced pressure to obtain 59 gm of oil containing the dimethylketal of 2-(m-butoxyphenylimino) propionaldehyde.

As far as is known, this compound is not described in the literature.

STEP B: 2 -(m-butoxyaniline)-propionaldehyde 58 gm of the oil in Step A were dissolved in 146 cc of ethanol and a solution of 4.7 gm of sodium borohydride was slowly added with stirring over 4 hours at room temperature. Excess sodium borohydride was destroyed by the addition of a mixture of ethanol and acetic acid and the reaction mixture was poured into water. The oil which was decanted off was extracted with methylene chloride and the methylene chloride solution was washed and concentrated to dryness under reduced pressure. Rectification of the residue gave 16.9 gm of a first fraction (boiling range of 100°–145° C at 0.8 mm Hg) and 10.5 gm of a main fraction (boiling range of 145°–150° C at 0.8 mm Hg) and treatment of the 16.9 gm of first fraction with sodium borohydride as previously gave 14 gm of product equivalent to the said main fraction which made a total yield of 24.5 gm of raw dimethylketal of 2-(m-butoxyanilino) propionaldehyde which was used as such for the next step.

As far as is known, this compound is not described in the literature.

STEP C: 2-methyl-6-butoxy-indole 20 gm of raw dimethylketal of 2-(m-butoxyanilino) propionaldehyde were dissolved in 160 cc of benzene and borontrifluoride was bubbled into the solution for 45 minutes at 37° C and then for 1 hour at 20° C. The solution was degassed by bubbling argon therethrough and 40 cc of water were slowly added thereto. The benzene phase was separated by decanting and was washed, dried and concentrated to dryness. The residue was dissolved in a 9:1 mixture of benzene-ethylacetate and the solution was passed through a silica column. After elimination of the solvent, the next fraction of 8.4 gm of 2-methyl-6-butoxy-indole melting at 50°–55° C was recovered.

| Analysis: | $C_{13}H_{17}NO$; molecular weight = 203.28 | | |
|---|---|---|---|
| Calculated: | %C 76.81 | %H 8.43 | %N 6.89 |
| Found: | 76.6 | 8.1 | 6.6 |

U. V. Spectrum (ethanol)

| λ max at 223 mμ | $E_{1cm}^{1\%}$ | = 1600 |
|---|---|---|
| λ max. at 265 mμ | $E_{1cm}^{1\%}$ | = 262 |
| inflexion towards 290 mμ | $E_{1cm}^{1\%}$ | = 241 |
| λ max. at 294 mμ | $E_{1cm}^{1\%}$ | = 249 |
| λ max. at 370 mμ | $E_{1cm}^{1\%}$ | = 2.5 |

As far as is known, this compound is not described in the literature

STEP D: 2-methyl-3-p-chlorobenzoyl-6-butoxy-indole 2 gm of 2-methyl-6-butoxy-indole were added to a suspension of 3.67 gm of N,N-dimethyl-p-chlorobenzamide in 1.15 cc of phosphorus oxychloride and The mixture was heated at 80°–85° C for 2 hours. After cooling to 50° C, 60 cc of ethanol were added to the mixture and the solution was poured into water. The pH of the solution was adjusted to 10 by the addition of sodium hydroxide solution and after stirring for 2 hours at room temperature, the mixture was vacuum filtered. The precipitate was washed with water until the wash waters were netural, empasted with ether and recrystallized from ethanol and dried at 70° C in vacuo to obtain 1.85 gm (54% yield) of 2-methyl-3-p-chlorobenzoyl-6-butoxy-indole melting at 175° C.

The product occurred in the form of pale yellow crystals soluble in ethanol and soluble in chloroform and insoluble in water and ether.

Analysis: $C_{20}H_{20}ClNO_2$; molecular weight = 341.83
Calculated: %C 70.27   %H 5.90   %Cl 10.37   %N 4.10
Found:         70.2    6.1      10.6       3.7

Analysis: $C_{22}H_{22}ClNO_4$; molecular weight = 399.87
Calculated: %C 66.08   %H 5.55   %Cl 8.87   %N 3.50
Found:         65.9    5.4      9.1        3.1

U. V. Spectrum (ethanol)

| | | |
|---|---|---|
| λ max. at 214 mμ | $E^{1\%}_{1cm}$ | = 1205 |
| λ max. at 249 mμ | $E^{1\%}_{1cm}$ | = 582 |
| λ max. at 290 mμ | $E^{1\%}_{1cm}$ | = 320 |
| λ max. at 332 mμ | $E^{1\%}_{1cm}$ | = 193 |

U. V. Spectrum (ethanol - 0.1N Hcl)

| | | |
|---|---|---|
| λ max. at 214 mμ | $E^{1\%}_{1cm}$ | = 1005 |
| λ max. at 252 mμ | $E^{1\%}_{1cm}$ | = 521 |
| λ max. at 292–293 mμ | $E^{1\%}_{1cm}$ | = 273 |
| λ max. at 331 mμ | $E^{1\%}_{1cm}$ | = 167 |

As far as is known, this compound is not described in the literature.

STEP E: 1-carbomethoxymethyl-2-methyl-3-p-chlorobenzoyl-6-butoxy-indole

A solution of 5.4 gm of 2-methyl-3-p-chlorobenzoyl-6-butoxy-indole in 50 cc of dimethylformamide was added to a mixture of 10 cc of dimethylformamide and 0.76 gm of a 50% suspension of sodium hydride in mineral oil with an evolution of 360 cc of hydrogen and then a solution of 1.7 cc of methyl monochloroacetate in 10 cc of dimethylformamide was added thereto. The mixture was stirred overnight at room temperature and then evaporated to dryness in vacuo and the residue was added to water. The precipitate formed was recovered by a vacuum filtration and was washed with water. The precipitate was redissolved in hot methanol, treated with carbon black, filtered and then cooled and vacuum filtered. The precipitate was dried at 70° C in vacuo to obtain 4.8 gm (73% yield) of 1-carbomethoxymethyl-2-methyl-3-p-chlorobenzoyl-6-butoxy-indole melting at 102° C.

The product occurred in the form of pale yellow crystals soluble in chloroform and methanol, slightly soluble in ether and insoluble in water. The product was used as is for the next step.

As far as is known, this compound is not described in the literature.

STEP F: 1-carboxymethyl-2-methyl-3-p-chlorobenzoyl-6-butoxy-indole 5.55 g of 1-carbomethoxymethyl-2-methyl-3-p-chlorobenzoyl-6-butoxy-indole was added to a solution of 1.5 gm of potassium hydroxide pellets in 100 cc of methanol and 10 cc of water and the mixture was heated at reflux for 1 hour and evaporated to dryness under reduced pressure. The residue was dissolved in 100 cc of boiling water and the solution was treated with carbon black and was vacuum filtered. The pH of the filtrate was adjusted to 1 by the addition of hydrochloric acid and was vacuum filtered. The precipitate was washed with water until the wash waters were netural, recrystallized from ethanol, vacuum filtered and dried in vacuo at 70° C to obtain 3.80 gm (71.5% yield) of 1-carboxymethyl-2-methyl-3-p-chlorobenzoyl-6-butoxy-indole melting at 219°–220° C.

The product occurred in the form of pale yellow crystls soluble in ethanol and insoluble in water, ether and chloroform.

As far as is known, this compound is not described in the literature.

EXAMPLE X

Preparation of d,1-1-(α-carboxyethyl)-2-methyl-3-p-chlorobenzoyl-6-chloro-indole STEP A: d,1-1-(α-carboethoxyethyl)-2-methyl-3-p-chlorobenzoyl-6-chloro-indole A solution of 6 gm of 2-methyl-3-p-chlorobenzoyl-6-chloro-indole in 50 cc of dimethylformamide was added to a mixture of 1 gm of a 50 % suspension of sodium hydride in vaseline oil and 30 cc of dimethylformamide while maintaining the temperature below 30° C with evolution of 500 cc of hydrogen after which a solution of 10 gm of ethyl α-bromopropionate in 50 cc of dimethylformamide was added thereto. The solution was stirred for 20 hours and then was evaporated to dryness in vacuo. The residue was taken up with 200 cc of water and the aqueous mixture was extracted with methylene chloride. The organic phase was washed with water, dried over sodium sulfate and evaporated to dryness of obtain 9.8 gm of d, 1-1-(α-carboethoxyethyl)-2-methyl-3-   p-chlorobenzoyl-6-chloro-indole which was used as is for the next step.

As far as is known, this compound is not described in the literature.

STEP B: d,1-1-(α-carboxyethyl)-2-methyl-3-p-chlorobenzoyl-6-chloro-indole

A mixture of 8 gm of 1-(α-carboethoxyethyl)-2-methyl-3-p-chlorobenzoyl-6-chloro-indole and 2 gm of potassium hydroxide pellets in 3 cc of water and 60 cc of methanol was heated at reflux for 1 hour and then was evaporated to dryness. The residue was taken up with 200 cc of hot water which was then treated with carbon black and filtered. The pH of the filtrate was adjusted to 1 by addition of hydrochloric acid and the filtrate was vacuum filtered. The precipitate was dried in vacuo at 70° C to obtain 6 gm of d,1-1-(α-carboxyethyl)-2-methyl-3-p-chlorobenzoyl-6-chloro-indole which was purified by recrystallization from acetonitrile to obtain 2.2 gm (36% yield) of the said product melting at 140° C.

The product occurred as a colorless solid soluble in alcohol and dilute alkalis, slightly soluble in ether and insoluble in water.

| Analysis: | $C_{19}H_{15}Cl_2NO_3$; molecular weight = 376.25 | | | |
|---|---|---|---|---|
| Calculated: | %C 60.65 | %H 4.02 | %Cl 18.85 | %N 3.72 |
| Found: | 60.7 | 3.8 | 18.5 | 3.7 |

| Analysis: | $C_{16}H_{10}ClFNO$; molecular weight = 286.71 | | | | |
|---|---|---|---|---|---|
| Calculated: | %C 67.03 | %H 3.51 | %Cl 12.37 | %F 6.62 | %N 4.89 |
| Found: | 67.0 | 3.9 | 12.3 | 6.6 | 5.0 |

As far as is known, this compound is not described in the literature.

EXAMPLES XI to XVI

Using the procedure of Example I and starting from 2-methyl-indoles and N,N-dialkylbenzamides with appropriate substituents the corresponding 2-methyl-3-COR-6-R'-indole (A) and the methyl esters (B) and the free acids (C) of 1-carboxylakyl-2-methyl-3-COR-6-R'-indoles of Table I were prepared. The products in columns A, B and C of Table I, as far as is known, are not described in the literature. The esters were not purified and were used as is for forming the corresponding acids.

STEP B: methyl 2-methyl-3-p-fluorobenzoyl-6-chloro-indolyl-1α-propionate

A mixture of 6.8 gm of 2-methyl-3-p-fluorobenzoyl-6-chloro-indole, 20 cc of dimethylformamide and 1.2 gm of a 50% suspension of sodium hydride in oil was stirred until hydrogen evolution stopped and stirring was continued for another hour. Then, 4 cc of methyl α-bromopropionate were added thereto and the mixture was stirred overnight at room temperature. The solvent was then evaporated off and the residue was taken up in 100 cc of water. The aqueous solution was extracted with methylene chloride and the organic phase was treated with carbon black and was evaporated to dryness to obtain 9 gm of methyl 2-methyl-3-p-fluorobenzoyl-6-chloro-indolyl-1α-propionate which

TABLE I

| EXAMPLE | A | B | C |
|---|---|---|---|
| XI | 2-methyl-3-p-chloro-benzoyl-6-methoxy indole<br>M. P. - 208°C | 1-carbomethoxy-ethyl-2-methyl 3-p-chlorobenzoyl-6-methoxy indole | 1-carboxyethyl-2-methyl-3-p-chlorobenzoyl-6-methoxy-indole<br>M.P. -267°C |
| XII | 2-methyl-3-o-chloro-benzoyl-6-methoxy-indole<br>M. P. - 228°C | 1-carbomethoxy-methyl-2-methyl-3-o-chlorobenzoyl-6-methoxy indole | 1-carboxymethyl-2-methyl-3-o-chlorobenzoyl-6-methoxy-indole<br>M.P.-232°C |
| XIII | 2-methyl-3-hexahydro benzoyl-6-methoxy indole<br>M. P. - 172°C | 1-carbomethoxy-methyl-2-methyl 3-hexahydrobenzoyl-6-methoxy-indole | 1-carboxymethyl-2-methyl-3-hexahydrobenzoyl-6-methoxy-indole<br>M. P.-208°C |
| XIV | 2-methyl-3-p-methoxy-benzoyl-6-chloro-indole<br>M.P. - 223°C | 1-carbomethoxy-methyl-2-methyl-3-p-methoxy-benzoyl-6-chloro-indole | 1-carboxymethyl-2-methyl-3-p-methoxybenzoyl-6-chloro-indole<br>M. P. 224°C |
| XV | 2-methyl-3-(p methylsulfonyl benzoyl)-6-methoxy indole<br>M.P. - 244°c | 1-carbomethoxy-methyl-2-methyl-3-(p-methylsulfonylbenzoyl)-6 methoxy-indole | 1-carboxymethyl-2-methyl-3-(p-methylsulfonyl benzoyl)-6-methoxy-indole<br>M.P. -290°C |

EXAMPLE XVI

Preparation of 1-(α-carboxyethyl)-2-methyl-3-p-fluorobenzoyl-6-chloro-indole

STEP A: 2-methyl-3-p-fluorobenzoyl-6-chloro-indole 3.6 gm of p-fluoro-dimethylbenzamide (prepared in Step A of Example II) were dissolved with stirring in 1.5 cc of phosphorus oxychloride and then 3.3 gm of 2-methyl-6-chloro-indole were added thereto. The reaction mixture was heated for 2 hours at 80°-90° C and then 100 cc of boiling ethanol were added thereto. The mixture was poured into hot water and stirred and after cooling, the pH of the solution was adjusted to 10 by the addition of a sodium hydroxide solution. The mixture was stirred for 24 hours and the precipitate formed was washed with ethanol to obtain 4.2 gm of 2-methyl-3-p-fluorobenzoyl-6-chloro-indole melting at 236° C and which was used as is for the next step.

The product occurred in the form of a yellow solid which was soluble in methylene chloride, slightly soluble in alcohols and ether and insoluble in water.

As far as is known, this compound has not been described in the literature.

was used as is for the next step.

The product occurred in the form of an amphorus solid soluble in the usual solvents, slightly soluble in ethanol and insoluble in water. As far as is known, this compound is not described in the literature.

STEP C: 1-(α-carboxyethyl)-2-methyl-3-p-fluorobenzoyl-6-chloro-indole

A mixture of 9 gm of the raw methyl ester of Step B, 2.5 gm of potassium hydroxide, 200 cc of methanol and 10 cc of water was refluxed for 1 hour and then the methanol was evaporated off. The residue was taken up in 200 cc of water and the aqueous solution was treated with carbon black and filtered. The pH of the filtrate was adjusted to 1 by the addition of hydrochloric acid and the mixture was filtered and was concentrated to dryness in vacuo. The 7 gm of residue were crystallized from a 50-50 water-alcohol mixture, was washed with ethanol and then ether and dried to obtain 3.2 gm of 1-(α-carboxy ethyl)-2-methyl-3-p-fluorobenzoyl-6-chloro-indole melting at 140° C.

| ANALYSIS: | $C_{19}H_{15}ClFNO_3$; molecular weight = 359.78 | | | | |
|---|---|---|---|---|---|
| CALCULATED: | %C 63.46 | %H 4.20 | %Cl 9.85 | %F 5.23 | %N 3.89 |
| FOUND: | 63.6 | 4.3 | 10.1 | 5.5 | 4.0 |

As far as is known, this compound is not described in the literature.

PHARMACOLOGICAL DATA

1. Analgesic Activity

The test employed is based on the fact noted by Koster et al (Fed.Proc. 1959,18,412) according to which the intraperitoneal injection of acetic acid provokes in mice repeated characteristic movements of contractions and stretchings which persist for more than 6 hours. Analgesics prevent or suppress this syndrome which from this fact can be considered as the exterior sympton of a diffuse abdominal pain.

A solution of acetic acid containing 6 parts per 1,000 parts in water containing 10% of gum arabic is utilized and the dose releasing the syndromeunder this conditions is 0.01 cc/gm or 60 mg/kg of acetic acid. The analgesics were administered orally ½ hour before the intraperitoneal injection of acetic acid. The mice were not fed since the day before the start of the test. For each dose and for the controls necessary for each test, one or several groups of five animals are utilized. The stretchings were observed and counted for each mouse for a period of observation of 15 minutes commencing immediately after the injection of acetic acid and then added by the groups of five. The products studied, utilized in aqueous suspension, were administered orally at different doses. While aspirin had an $ED_{50}$ of 160 mg/kg., 1-carboxymethyl-2-methyl-3-p-chlorobenzoyl-6-methoxy-indole had an $ED_{50}$ in the said test of about 10 mg/kg.

1-$\alpha$-carboxyethyl-2-methyl-3-p-fluorobenzoyl-6-chloro-indole had an $ED_{50}$ of about 10 mg/kg, 1-carboxymethyl-2-methyl-3-p-methoxybenzoyl-6-methoxy-indole had an $ED_{50}$ of about 5 mg/kg, 1-($\alpha$-carboxy ethyl)-2-methyl-3-p-chlorobenzoyl-6-chloro-indole had an $ED_{50}$ of about 2 mg/kg, and 1-carboxymethyl-2-methyl-3-p-fluorobenzoyl-6-methoxy-indole had an $ED_{50}$ of about 2mg/kg. In contrast, the $ED_{50}$ of 1-(carboxymethyl)-2-methyl-3-p-chlorobenzoyl-5-methoxy-indole of French Pat. No. 1,492,929 is 50 mg/kg and the $ED_{50}$ of 1-($\beta$-carboxyethyl)-2-methyl-3-p-chlorobenzoyl-5-methoxy-indole of U.S. Pat. No. 3,505,354 is 500 mg/kg.

2. Anti-inflammatory effect.

The test employed is that of Branceni et al (Arch. Int. Pharmacodyn, 1964, 152, 15), slightly modified and consisted in administering to rats weighing about 150 gm a single injection of 1 mg of naphthoylheparamine (NHA) in the plantary aponevrose of the hind paw. This injection is designed to provoke the formation of an inflammatory edema. The products to be studied were administed orally in aqueous suspension 1 hour before the injection.

The inflammation was determined by plethysmometry; the volume of the pay expressed in arbitrary units as measured immediately before and 2 hours after the irritating injection.

The volumes at hour 2 were adjusted to their initial level by analysis of covariance. The degree of inflammation was calculated in percent of that of the control animals taking into account the adjusted values. The active doses which reduced the inflammation by 40% ($DE_{40}$) were thus determined.

The $DE_{40}$ of 1-carboxymethyl-2-methyl-3-p-fluorobenzoyl-6-methoxy-indole was 30-50 mg/kg and of 1-carboxymethyl-2-methyl-3-p-chlorobenzoyl-6-methoxy-indole was 30 mg/kg. The $DE_{40}$ of 1-carboxymethyl-2-methyl-3-p-methoxy-benzoyl-6-methoxy-indole was 50 mg/kg., of 1-($\alpha$-carboxymethyl)-2-methyl-3-p-chlorobenzoyl-6-chloro-indole was 5 to 10 mg/kg, and of 1-($\alpha$-carboxymethyl)-2-methyl-3-p-fluorobenzoyl-6-chloro-indole was 5 mg/kg. In contrast thereto, anti-inflammatory activity of 1-(carboxymethyl)-2-methyl-3-p-chlorobenzoyl-5-methoxy-indole of French Pat. No. 1,492,929 had a $DA_{40}$ of greater than 300 mg/kg at which dose there was no activity and 1-($\beta$-carboxyethyl)-2-methyl-3-p-chlorobenzoyl-5-methoxy-indole of U.S. Pat. No. 3,505,354 has a $DA_{40}$ of 300 mg/kg.

We claim:

1. A method of treating pain in humans which comprises administering to humans a safe and analgesically effective amount of a compound selected from the group consisting of (a) 1-(carboxymethyl)-2-methyl-3-p-chlorobenzyl-6-methoxy-indole, (b) 1-(carboxymethyl)-2-methyl-3-p-methoxy-benzoyl-6-methoxy-indole, (c) 1-(carboxymethoxy)-2-methyl-3-p-fluorobenzoyl-6-methoxy-indole, (d) 1-($\alpha$-carboxyethyl)-2-methyl-3-p-chlorobenzoyl-6-chloro-indole or (e) 1-($\alpha$-carboxy-ethyl)-2-methyl-3-p-fluorobenzoyl-6-chloroindole and a lower alkyl ester thereof and salt thereof with a non-toxic, therapeutically acceptable base. carboxy-ethyl)-2-methyl-3-p-fluorobenzoyl-6-chloro-indole and a lower alkyl ester thereof and salt thereof with a non-toxic, therapeutically acceptable base.

2. The method of claim 1 wherein the indole is 1-carboxymethyl-2-methyl-3-p-chlorobenzoyl-6-methoxy-indole.

3. The method of claim 1 wherein the indole is 1-carboxymethyl-2-methyl-3-p-methoxybenzoyl-6-methoxy-indole.

4. The method of claim 1 wherein the indole is 1-carboxymethyl-2-methyl-3-p-fluorobenzoyl-6-methoxy-indole.

5. The method of claim 1 wherein the indole is $dl$-1-$\alpha$-(carboxyethyl)-2-methyl-3-p-chlorobenzoyl-6-chloro-indole.

6. The method of claim 1 wherein the indole is $dl$-1-$\alpha$-(carboxyethyl)-2-methyl-3-p-fluorobenzoyl-6-chloro-indole.

* * * * *

UNITED STATES PATENT OFFICE
CERTIFICATE OF CORRECTION

Patent No. 3,856,967   Dated Dec. 24, 1974

Inventor(s) ANDRE ALLAIS and GERARD NOMINE

It is certified that error appears in the above-identified patent and that said Letters Patent are hereby corrected as shown below:

| Patent | | Appln. | | |
|---|---|---|---|---|
| Col. | Line | Page | Line | |
| 9 | 1 to 4 | 16 | 11 to 14 | Should read --The reaction mixture was heated to reflux and held there for 1 hour. The mixture concentrated to dryness under reduced pressure and the residue was taken up in hot water-- |
| 14 | 61 | 27 | 4 | "(Nujol)P:" should be --(Nujol):-- |
| 18 | 21 to 23 | 32 | 24 to 26 | Left Out |

--Analysis: $C_{16}H_{11}Cl_2NO$;

molecular weight = 304.17

Calculated: %C 63.17  %H 3.65

% Cl 23.31  %N 4.61

Found: 63.0  3.8  23.5  4.3

UNITED STATES PATENT OFFICE
CERTIFICATE OF CORRECTION

Patent No. 3,856,967  Dated Dec. 24, 1974

Inventor(s) ANDRE ALLAIS and GERARD NOMINE

It is certified that error appears in the above-identified patent and that said Letters Patent are hereby corrected as shown below:

| Patent Col. | Line | Appln. Page | Line | |
|---|---|---|---|---|
| 18 | 24 to 26 | | | Cancel "U.V. Spectrum (ethanol) $\lambda$max. at 226 m$\mu$  $E_{1cm}^{1\%}$ = 2,195 $\lambda$max. at 227 m$\mu$  $E_{1cm}^{1\%}$ = 436 inflexion towards 287 m$\mu$  $E_{1cm}^{1\%}$ = 387 " |
| 20 | 54 | 37 | 13 | "The" should be --the-- |
| 21 | 67 | 39 | 24&25 | "crystls" should be --crystals-- |

Signed and sealed this 18th day of March 1975.

(SEAL)
Attest:

RUTH C. MASON
Attesting Officer

C. MARSHALL DANN
Commissioner of Patents
and Trademarks